United States Patent
Bouillot et al.

(10) Patent No.: US 8,820,172 B2
(45) Date of Patent: Sep. 2, 2014

(54) FLIGHT UNIT CONTROL SYSTEM, FLIGHT CONTROL DEVICE INCLUDING SUCH A SYSTEM, AND USE OF SUCH A SYSTEM

(75) Inventors: Franck Bouillot, Valence (FR); Cédric Milord, Marches (FR)

(73) Assignee: SKF Aerospace France, Saint-Vallier (FR)

( * ) Notice: Subject to any disclaimer, the term of this patent is extended or adjusted under 35 U.S.C. 154(b) by 622 days.

(21) Appl. No.: 13/101,369

(22) Filed: May 5, 2011

(65) Prior Publication Data
US 2011/0272521 A1    Nov. 10, 2011

(30) Foreign Application Priority Data

May 6, 2010   (FR) ...................................... 10 53543

(51) Int. Cl.
*F16B 31/02*    (2006.01)
*B64C 13/28*    (2006.01)
*B64C 9/02*     (2006.01)

(52) U.S. Cl.
CPC .. *B64C 13/28* (2013.01); *B64C 9/02* (2013.01)
USPC ......................................................... 73/761

(58) Field of Classification Search
USPC ......................................................... 73/761
See application file for complete search history.

(56) References Cited

U.S. PATENT DOCUMENTS

| 4,364,279 | A | 12/1982 | Stern |
| 5,811,738 | A | 9/1998 | Boyovich |
| 6,769,315 | B2 * | 8/2004 | Stevenson et al. ........ 73/862.629 |
| 7,644,636 | B2 * | 1/2010 | Gregory et al. .......... 73/862.621 |
| 7,683,274 | B2 * | 3/2010 | Dellac et al. ................... 177/211 |
| 7,946,529 | B2 * | 5/2011 | Moalic et al. ................ 244/99.4 |
| 7,983,854 | B2 * | 7/2011 | O'Brien .......................... 702/42 |
| 8,474,326 | B2 * | 7/2013 | Kempainen et al. ............ 73/856 |
| 2006/0266561 | A1 | 11/2006 | Dellac et al. |
| 2008/0315040 | A1 | 12/2008 | Moalic et al. |

FOREIGN PATENT DOCUMENTS

| DE | 4332137 C1 | 3/1995 |
| EP | 1726935 | 11/2006 |
| EP | 1972549 A1 | 9/2008 |

* cited by examiner

*Primary Examiner* — Lisa Caputo
*Assistant Examiner* — Octavia D. Hollington
(74) *Attorney, Agent, or Firm* — Dowell & Dowell PC

(57) ABSTRACT

A flight unit control system having at least one instrumented fastening bolt connecting an aircraft carrier structure and a load path, the instrumented bolt having at least one measurement area for detecting that the load path is under load and including a fastener for locking the instrumented bolt in a position relative to the aircraft carrier structure and load path and wherein the measurement area has two cavities and at least one strain gauge and wherein the fastener includes a plate which is positioned at a threaded end of the instrumented bolt which bears against one of the aircraft carrier structure and the load path and which extends perpendicularly to an axis of the bolt and a nut which is placed at the threaded end of the instrumented bolt to immobilize the instrumented bolt relative to the aircraft structure or the load path.

16 Claims, 14 Drawing Sheets

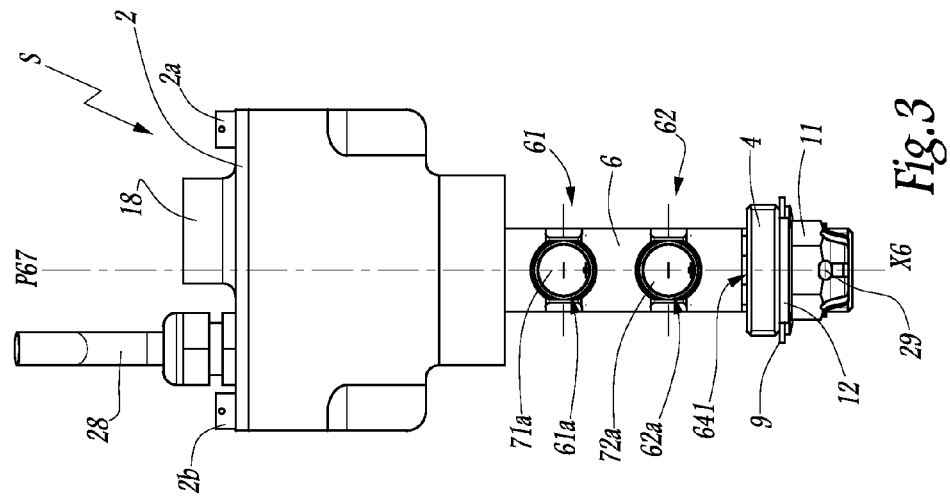
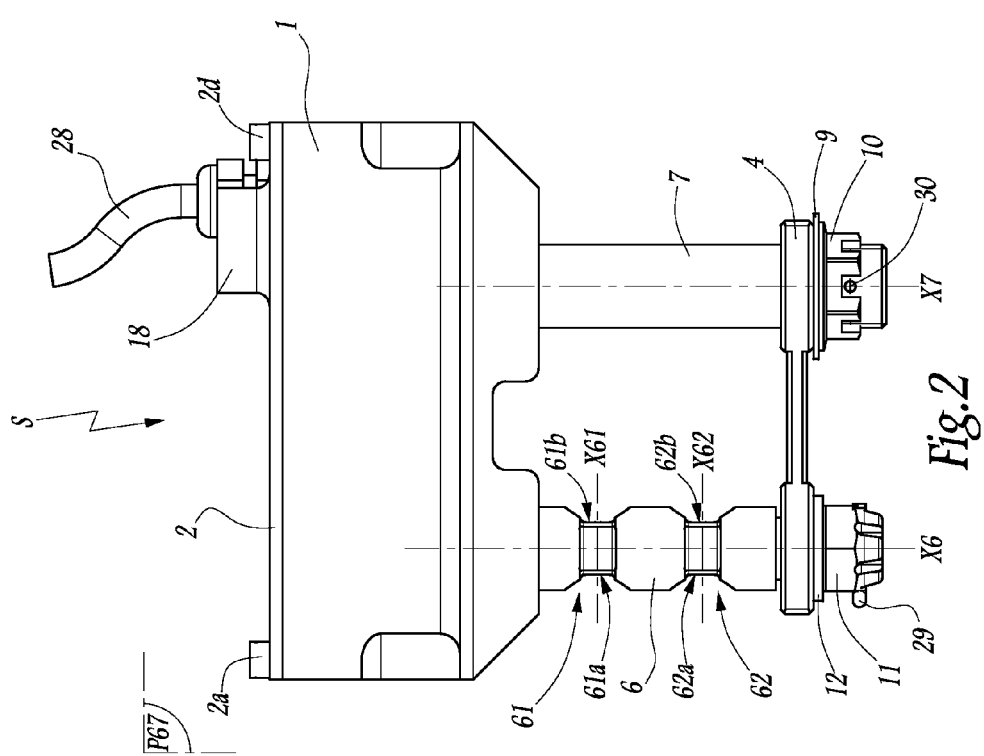

FLIGHT UNIT CONTROL SYSTEM, FLIGHT CONTROL DEVICE INCLUDING SUCH A SYSTEM, AND USE OF SUCH A SYSTEM

BACKGROUND OF THE INVENTION

Field of the Invention

The present invention relates to a flight unit control system. The invention also relates to a flight control device that includes such a system. Finally, the invention relates to the use of such a system for replacing a pre-existing system.

In particular, the invention is intended to be implemented on the secondary load path of an aircraft flight control actuator, for example an actuator of the THSA (Trimmable Horizontal Stabilizer Actuator) type, which is intended for controlling the pitch motivator, i.e. the angle of inclination of the tail of the aircraft relative to the nose of the aircraft.

BRIEF DESCRIPTION OF THE RELATED ART

As is known, such a THSA comprises a primary load path or PLP and a secondary load path or SLP. In normal operation, the load passes through the primary path, whereas in the event of failure of the primary path the load passes via the secondary path. In this case, the secondary path provides the mechanical link between the primary attachment structures of the THSA, as a replacement of the primary path. However, it is necessary for the pilot to be informed of this, as should the maintenance crew on the ground.

For this purpose, systems based on detecting the displacement or separation between various parts of the actuator are known. However, generally these systems lack reliability and are complicated to integrate into the actuator. Thus, in the event of such detection malfunctioning, it is possible that the rupture of the primary part is signalled neither to the pilot nor subsequently to the maintenance crew.

Consequently, so as to detect the failure of the primary path reliably and precisely, it is preferable to be able to detect the load exerted on the secondary path when it is under load. Moreover, it is necessary for the detected load to actually correspond to the failure of the primary path, thus avoiding any erroneous detection due to the external conditions or to the configuration.

EP-A-1 972 549 relates to a flight control actuator having a primary path and a secondary path, which is capable of taking up the load of the primary path in the event of failure. The secondary path comprises a fastening bolt that includes means for detecting that the secondary path is under load, in particular at least one sensor provided with extensometer gauges. According to one embodiment, each gauge cooperates with a projecting complementary element capable of stressing the gauge at least in certain configurations of loading the secondary path. Thus, the strain gauges are designed to be compressed, radially to the fastening bolt, by projecting complementary elements which are located on the flight control actuator yoke or on the attachment bracket. Consequently, it is necessary to modify the actuator, thereby extending the intervention time and increasing the cost. In addition, the reliability and the precision of the system are limited.

SUMMARY OF THE INVENTION

The object of the present invention is to provide an improved flight unit control system designed for detecting reliably and precisely the engagement of the secondary path of the attachment of a THSA-type actuator and for supplying corresponding information to the flight control computer.

For this purpose, one subject of the invention is a flight unit control system, comprising at least one instrumented fastening bolt connecting an aircraft carrier structure and a load path, the instrumented bolt having at least one measurement area for detecting that the load path is under load, the system comprising fastening means capable of locking the instrumented bolt in position relative to the aircraft carrier structure and to the load path, without stressing the instrumented bolt in the measurement area or areas, neither in tension nor in torsion, characterized in that the or each measurement area of the instrumented bolt comprises:

two cavities which are opposite each other in relation to its axis and separated from each other along a transverse axis by a thinned wall capable of being deformed under the action of a shear stress applied to the bolt, and at least one strain gauge which is placed in the bottom of a cavity against the thinned wall, each strain gauge being capable of detecting a deformation of the thinned wall, and in that said fastening means comprise:

a fastening plate which is positioned at a threaded end of the instrumented bolt, bearing against the aircraft carrier structure or the load path, and which extends perpendicularly to the axis of the bolt, and a nut which is placed on the threaded end of the instrumented bolt and is capable of immobilizing the instrumented bolt relative to the aircraft carrier structure or the load path against which the fastening plate bears.

Thus, the invention makes it possible to improve the reliability and the precision of detecting the load on the secondary path, with a system which is easy and quick to implement, in particular without modifying or removing the flight unit.

According to other advantageous features of the invention, taken individually or in combination:

the or each measurement area comprises two strain gauges each placed on one side of the thinned wall that forms a plane orthogonal to a shear plane for the instrumented bolt.

the system comprises two measurement areas located in shear planes for the bolt, which areas follow one after the other along the instrumented bolt and are located at the two plane interfaces respectively between the aircraft carrier structure and the load path.

the instrumented bolt has at least one flat which is placed between the threaded end and the measurement area closest to this threaded end, that portion of the bolt having the at least one flat being able to be housed in a complementary orifice of the fastening plate so that the instrumented bolt is locked and unable to rotate relative to the fastening means, and that the tensile forces exerted on the instrumented bolt by tightening the nut are localized substantially between the shoulder and the nut, away from the measurement area or areas.

the instrumented bolt has a transverse shoulder which is placed between the threaded end and the measurement area closest to this threaded end, the shoulder being capable of bearing against the fastening plate so that the instrumented bolt is locked, preventing it from moving translationally with respect to the fastening means, and in that the tensile stresses on the instrumented bolt generated by tightening the nut are localized substantially between the shoulder and the nut, away from the measurement area or areas.

the system also includes a second instrumented bolt that extends along an axis parallel to the axis of the first instrumented bolt and connects the aircraft carrier structure and the load path.

the system also comprises a non-instrumented bolt that extends along an axis parallel to the axis of the first instrumented bolt and connects the aircraft carrier structure and the load path; and a nut which is placed at a threaded end of the non-instrumented bolt and is capable of clamping the fastening plate against the aircraft carrier structure or the load path against which the fastening plate bears and which is designed to withstand essentially all of the clamping stresses of the plate.

preferably, the nut of the instrumented bolt and the nut of the non-instrumented bolt have different screw pitches, but are capable of being locked under the action of a substantially identical tightening torque.

the system also includes a casing in which an electronic card is placed in a substantially sealed manner, said card being connected to the strain gauge or gauges, and away from which most of the instrumented bolt and, where appropriate, most of the non-instrumented bolt extend.

the interior of the instrumented bolt includes a plurality of through-orifices in which connection wires are placed that connect the strain gauge or gauges and the electronic card located in the casing, with a longitudinal orifice that extends parallel to the first axis, where appropriate connecting the measurement areas together; and in each measurement area, a through-orifice that connects the strain gauges located in the corresponding cavities at the longitudinal orifice.

the casing has a projecting rotary knob, the knob being able to be manipulated by an operator so as to test the operation of the system.

the casing has display means, for example an indicating plate, which are capable of displaying the results of the test carried out by means of the knob.

the system also includes a spring washer which is positioned in the casing, between the head of the instrumented bolt and the casing, and which is capable, on the one hand, of damping the vibrations in the casing and, on the other hand, of keeping the instrumented bolt axially in place.

Another subject of the invention is a flight control device, especially for an actuator of the THSA type, comprising:

a primary load path capable of accommodating the load exerted in normal operation on an attachment of a flight control actuator; and a secondary load path capable of accommodating said load in the event of the primary path failing, the device being characterized in that the secondary load path comprises a flight unit control system according to one of the preceding claims.

Finally, another subject of the invention is the use of a flight unit control system as mentioned above for replacing a pre-existing system which equips a secondary load path based on an attachment of a flight control actuator, in particular to replace a pre-existing fastening bolt connecting an aircraft carrier structure and the secondary load path with the instrumented fastening bolt, without modifying the attachment of the flight control actuator.

Thus, the system according to the invention may be used to replace an existing system already installed on a THSA, without the need for completely removing this THSA. Moreover, if necessary, the system may be used only in part, simply to replace a conventional fastening bolt with an instrumented bolt. Thus, this use of the system according to the invention has major advantages in terms of maintenance, by reducing the mass maintained, the intervention time and therefore the cost of the ground maintenance operation.

BRIEF DESCRIPTION OF THE DRAWINGS

The invention will be better understood on reading the following description given solely by way of example and with reference to the drawings in which:

FIGS. 2 and 3 are side views of the system, along the arrows II and III of FIG. 1 respectively;

DESCRIPTION OF THE PREFERRED EMBODIMENTS

FIGS. 1 to 18 show a flight unit control system S.

In practice, the system S is in the form of a load sensing kit or LSK, ready to be installed on the secondary load path SLP of an aircraft flight unit, in particular on a THSA. Such an LSK is shown by itself, in one mounting configuration, in FIGS. 1 to 3.

Figure 16:
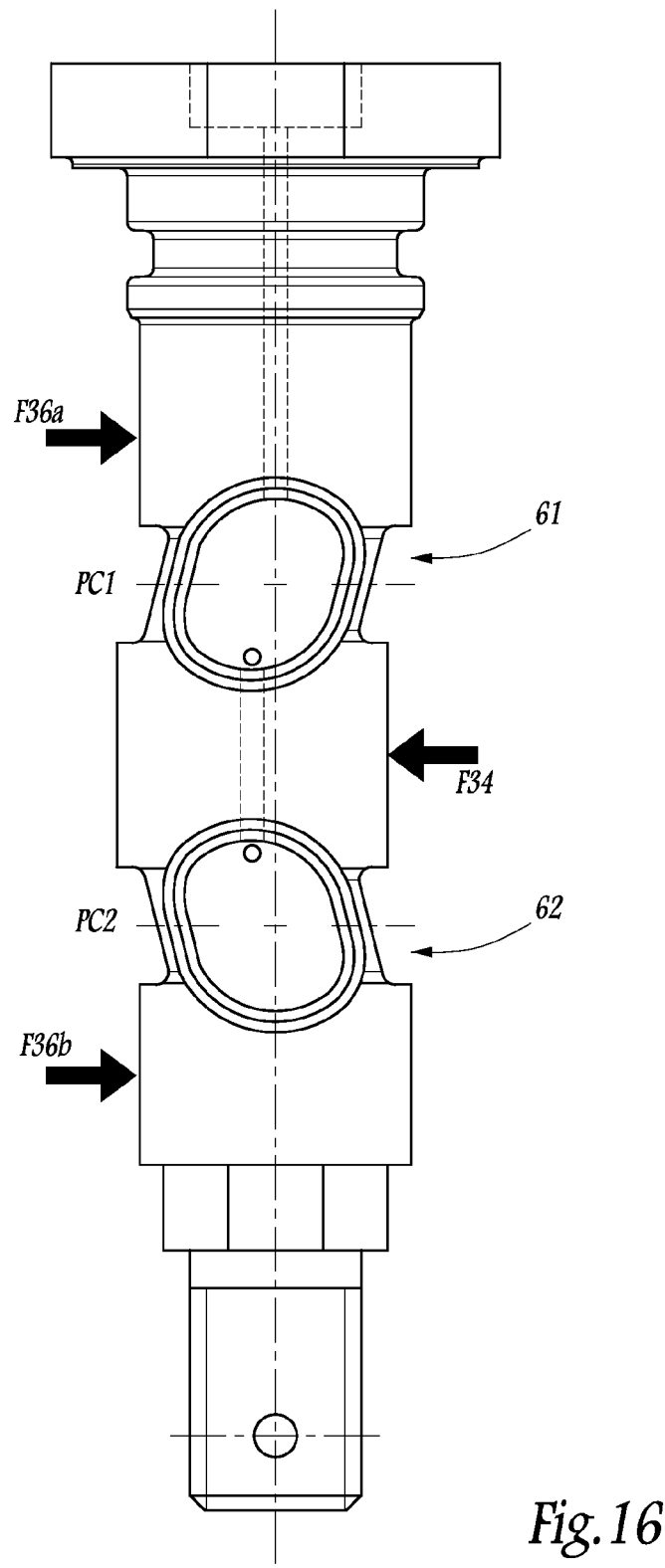
FIG. 16 is a view similar to FIG. 10, illustrating the instrumented bolt undergoing a shear deformation.
Figure 17:
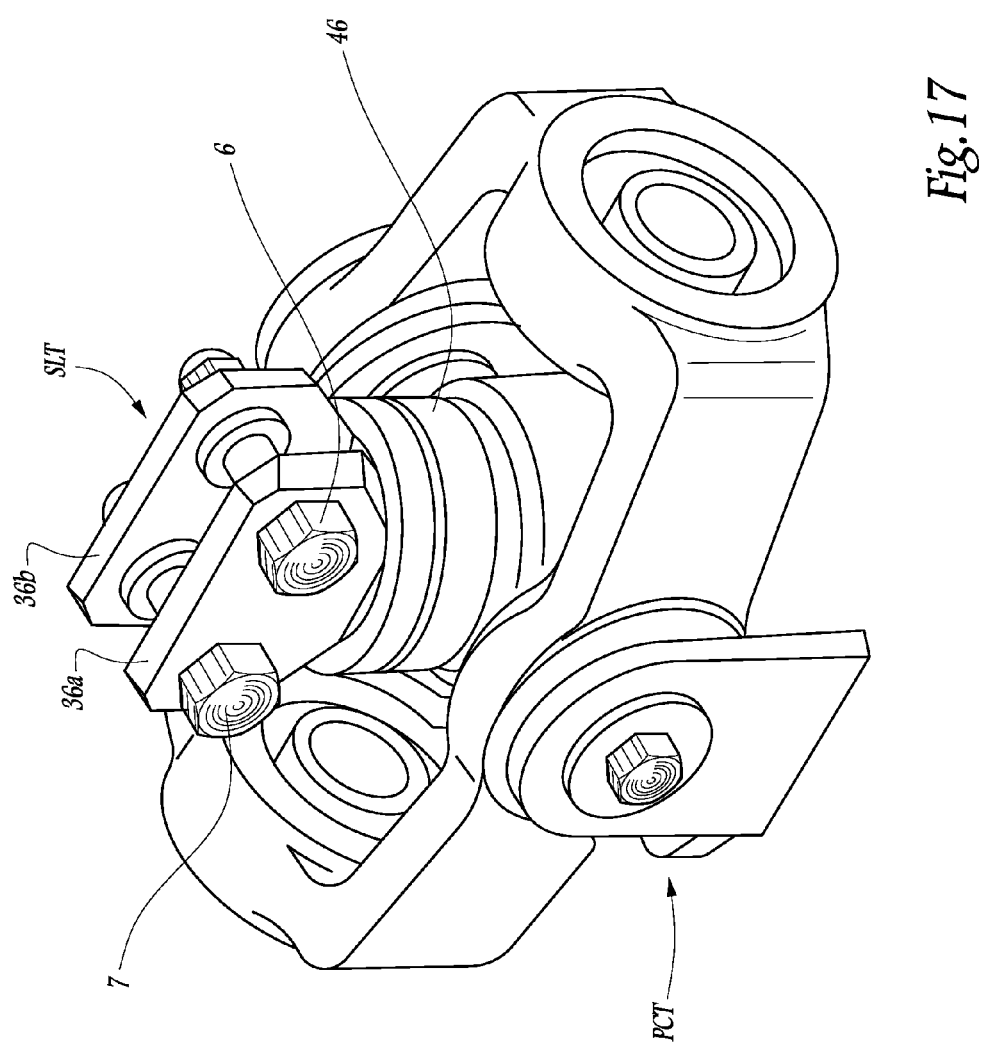
FIG. 17 is a perspective view of a THSA-type device with a secondary load path comprising the system according to the invention.
Figure 18:
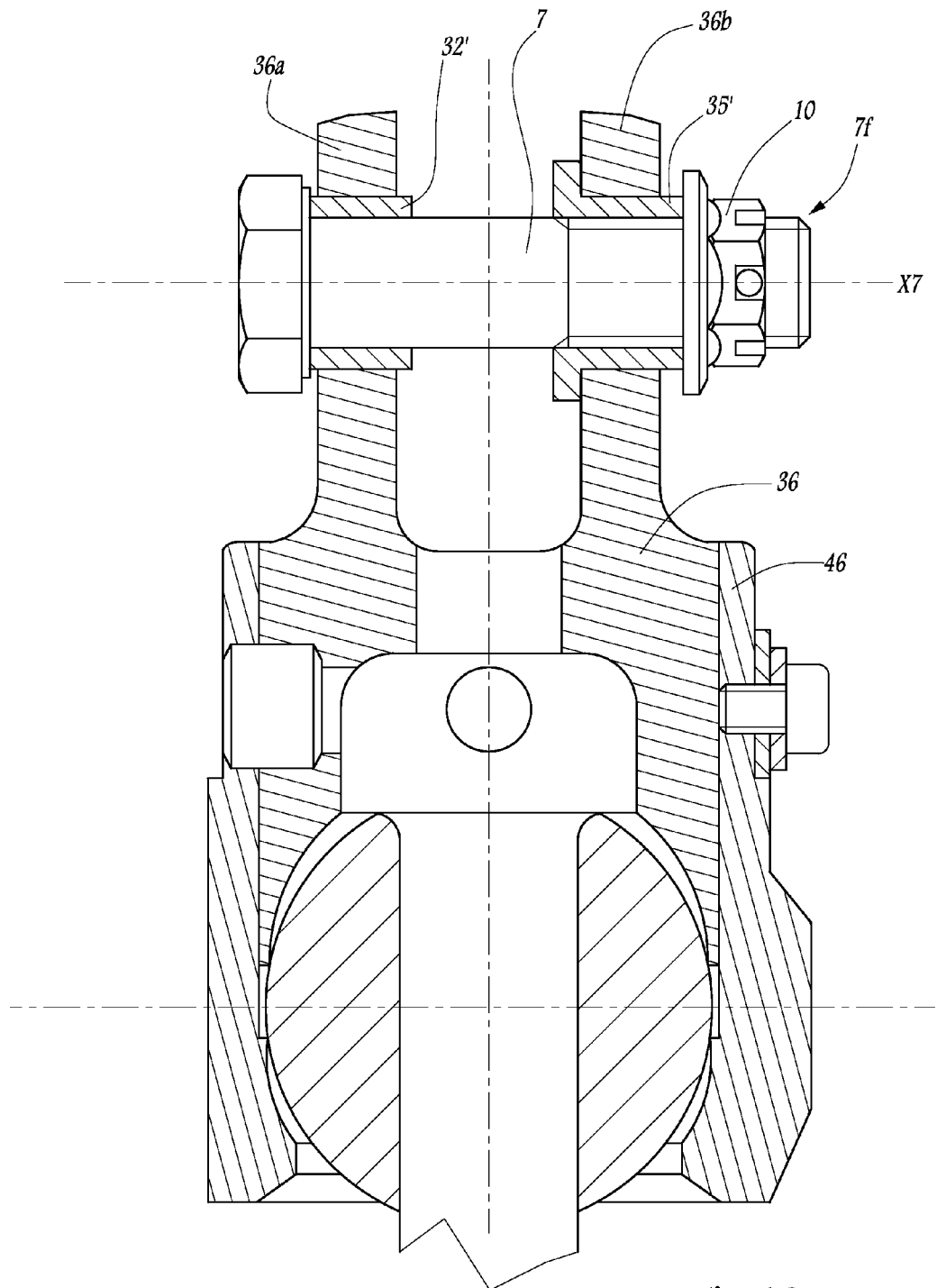
FIG. 18 is a cut-away partial cross section of the secondary path of FIG. 17.

Moreover, the system S can be seen in an operating configuration with the various elements of the SLP, in FIGS. 4 to 9, these figures making it possible to distinguish certain details that are otherwise difficult to appreciate, and also in FIGS. 17 and 18. Furthermore, FIGS. 10 to 16 show only an instrumented fastening bolt 6 with which the system S is equipped, as will be explained in detail later.

Figure 7:
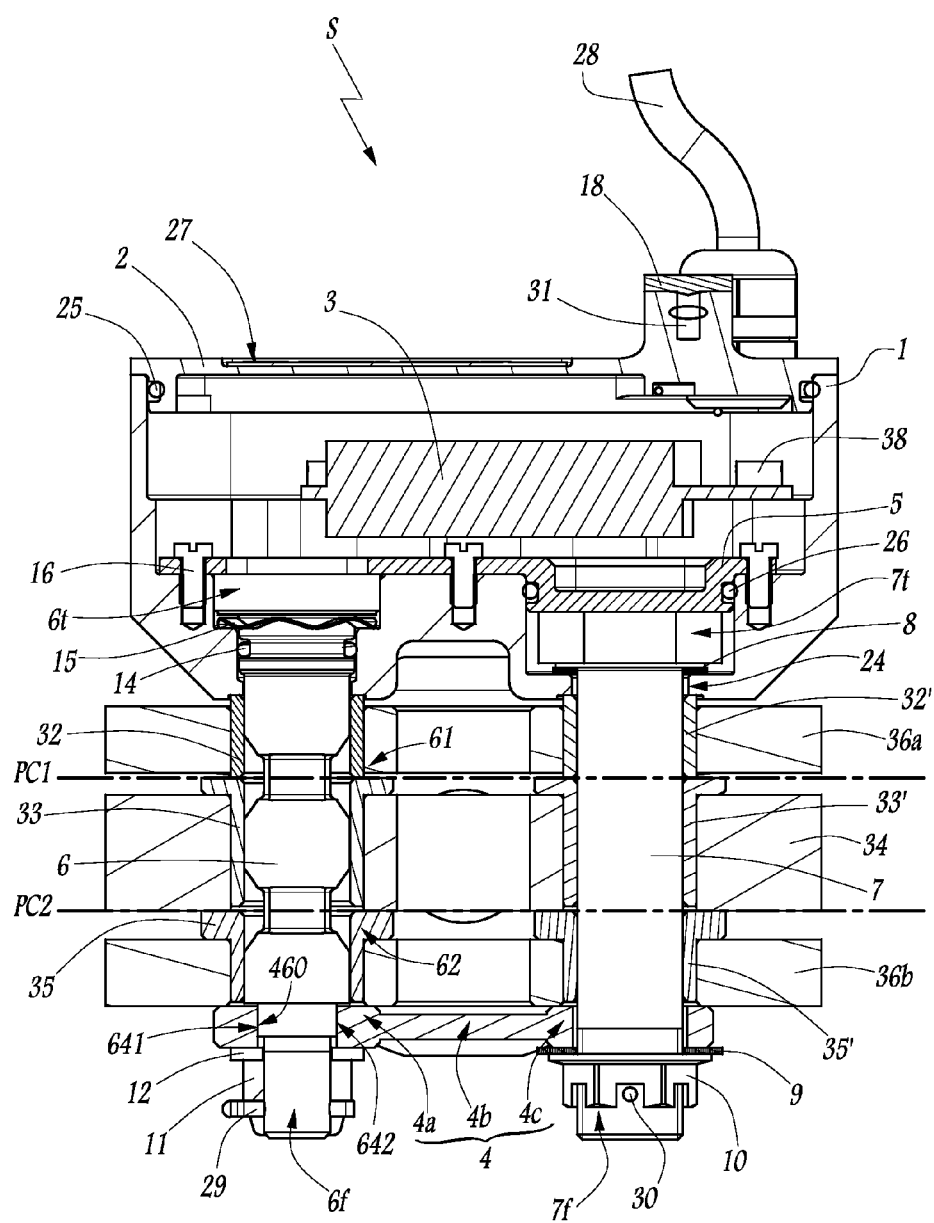
FIG. 7 is a cross section on the line VII-VII of FIG. 5.
Figure 8:
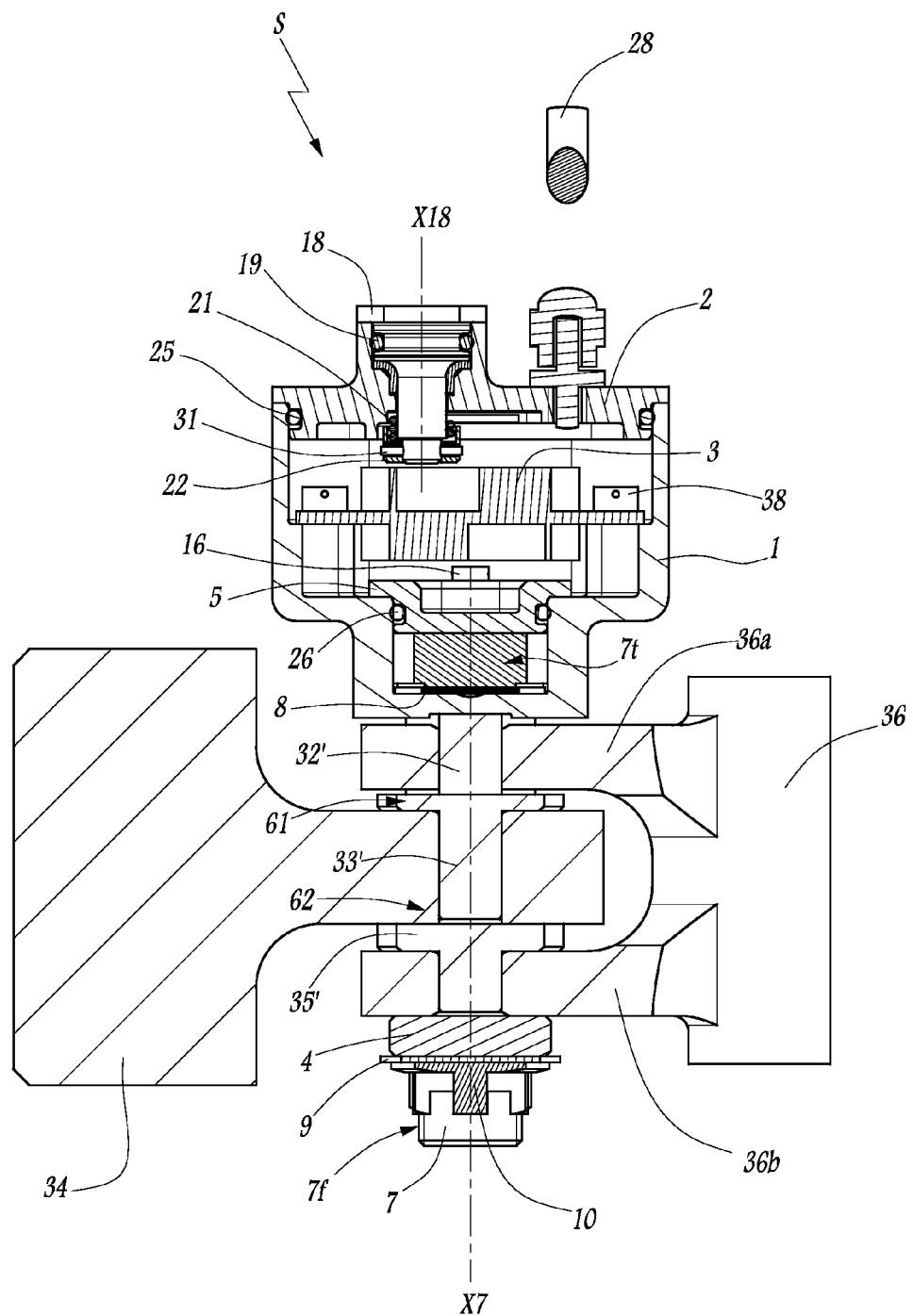
FIGS. 8 and 9 are cross sections on the lines VIII-VIII and IX-IX of FIG. 6 respectively.
Figure 9:
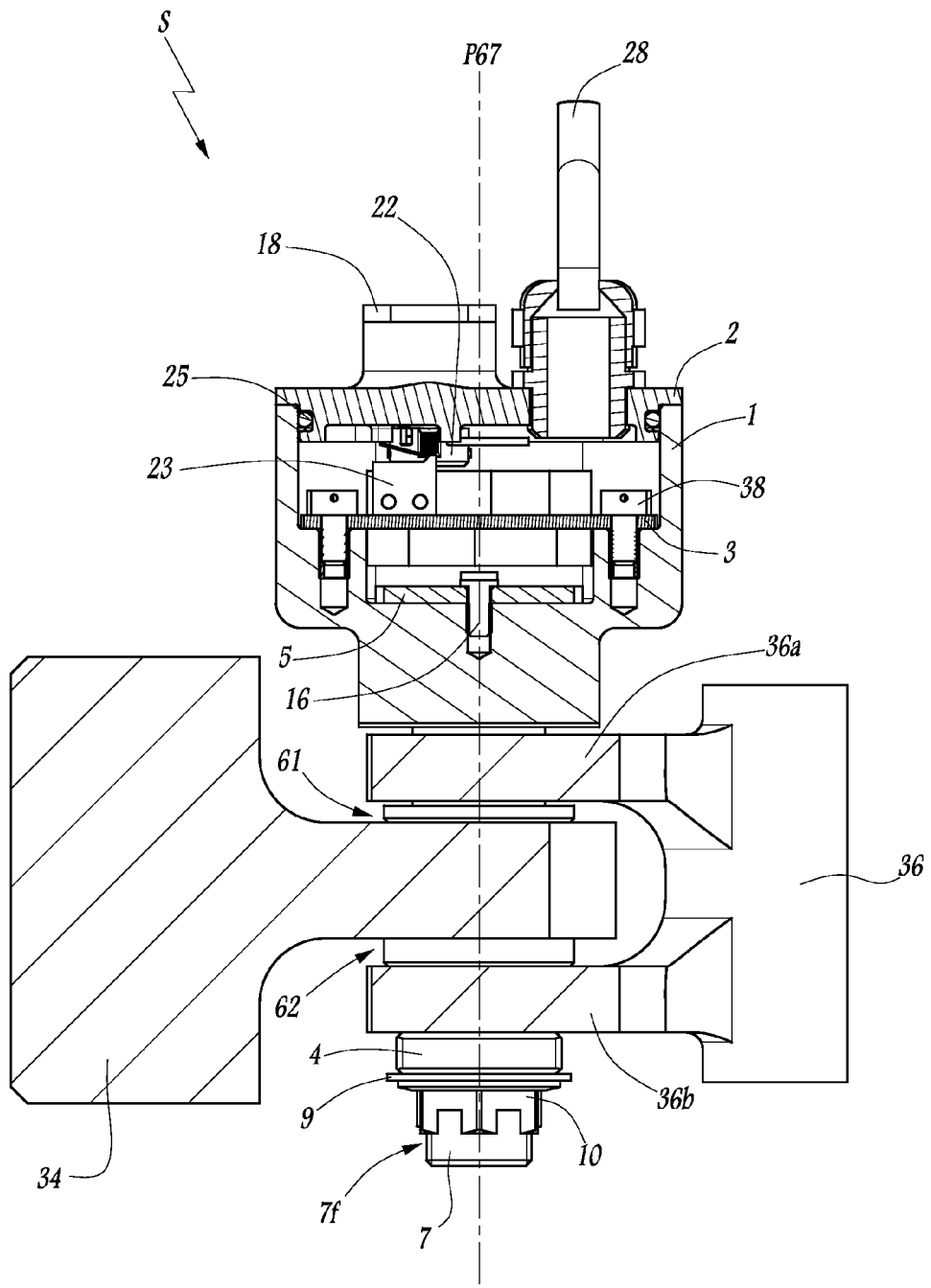
Figure 10:
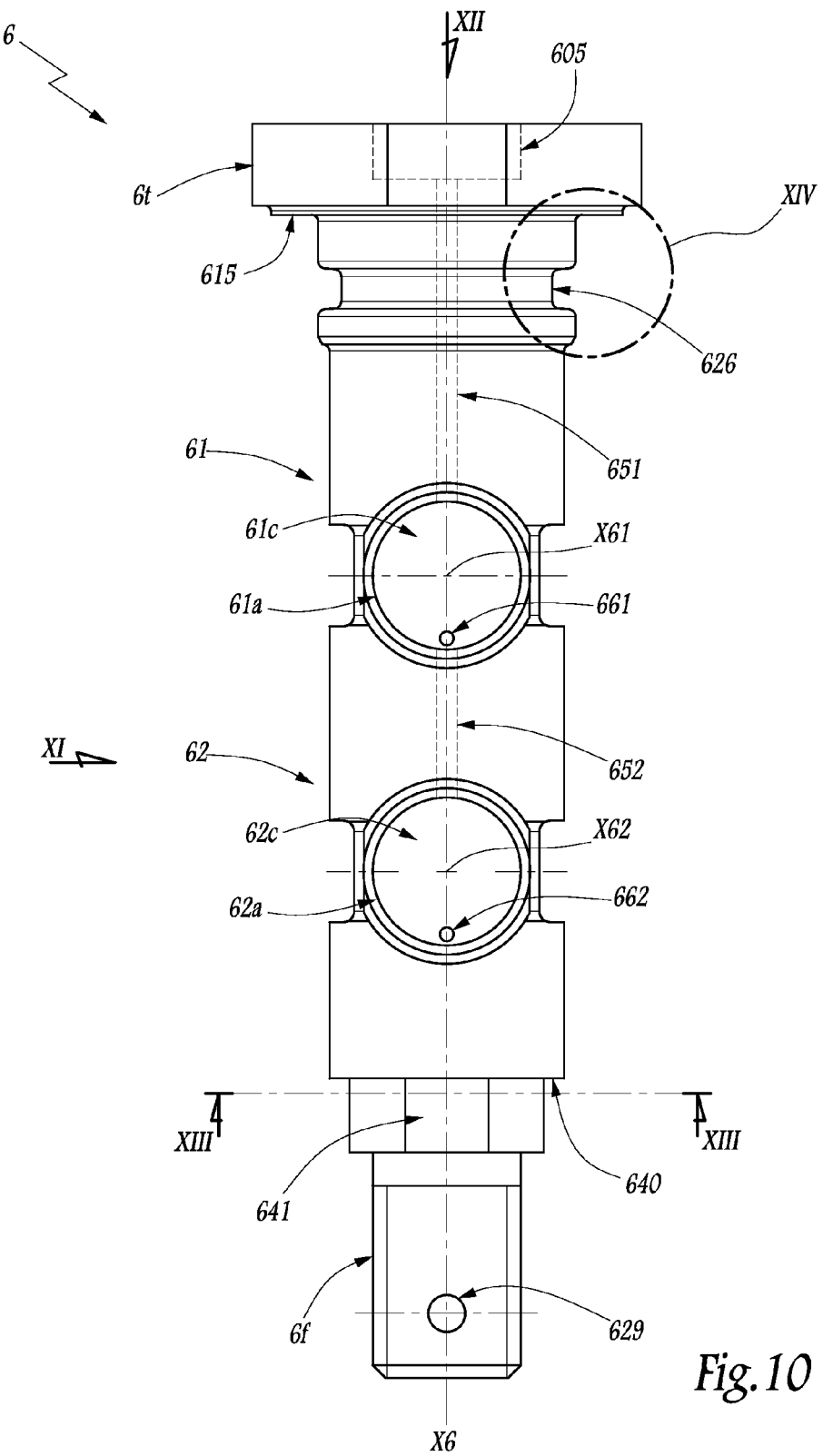
FIG. 10 is an elevation view of an instrumented bolt with which the system according to the invention is equipped.

The system S comprises a casing 1 provided with a cover 2. As shown in FIGS. 7 to 9, a seal 25 is placed in the cover 2 and is sealed around the internal perimeter of the casing 1. An electronic card 3 is placed in the casing 1, held in place by screws 38 and linked to an electronic system of the aircraft by a cable 28.

Figure 1:
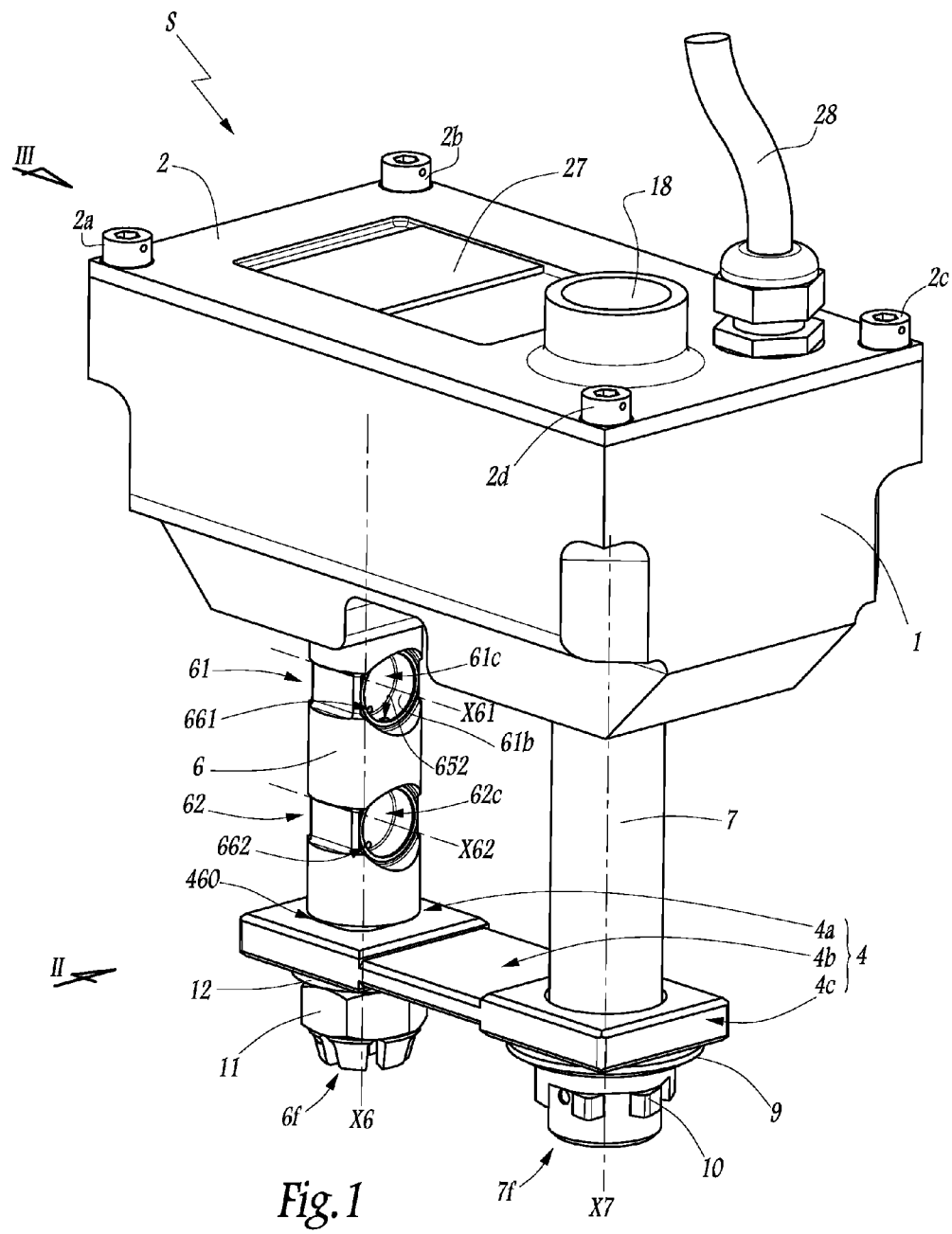
FIG. 1 is a perspective view of a flight unit control system according to the invention.
Figure 4:
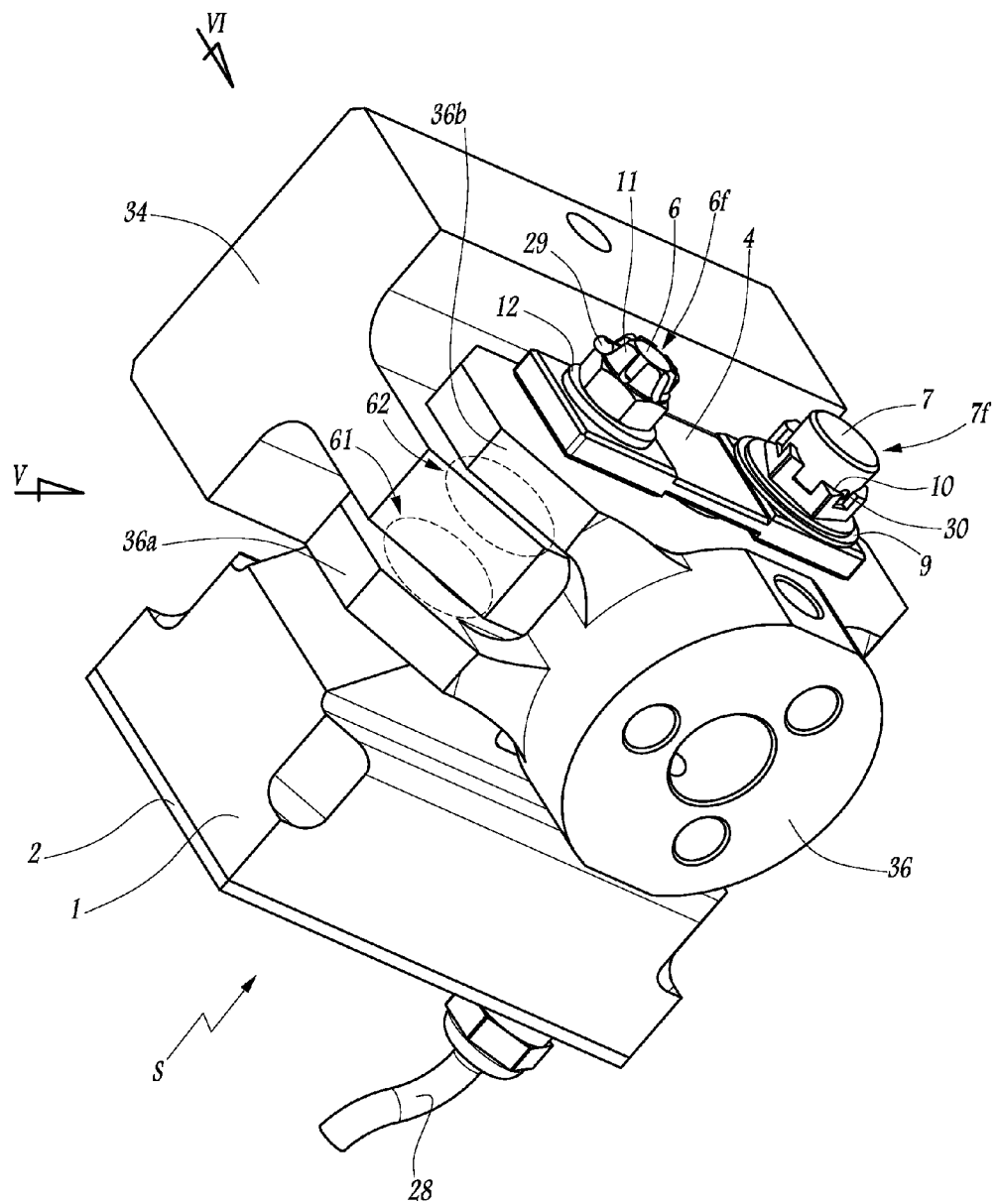
FIG. 4 is a perspective view of a secondary load path comprising the system of FIGS. 1 to 3.
Figure 5:
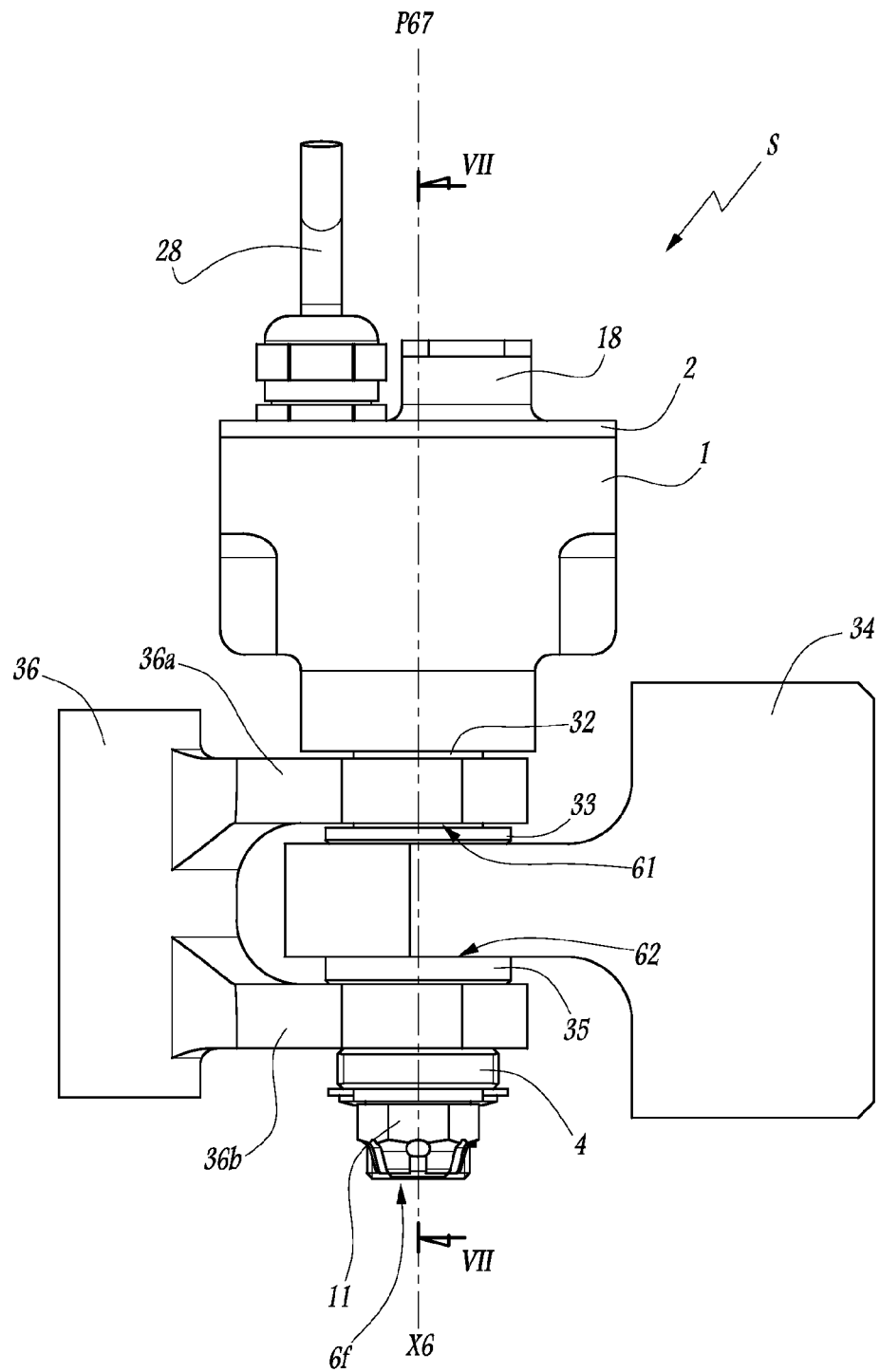
FIGS. 5 and 6 are side views of the secondary path of FIG. 4 along the arrows V and VI respectively.
Figure 6:
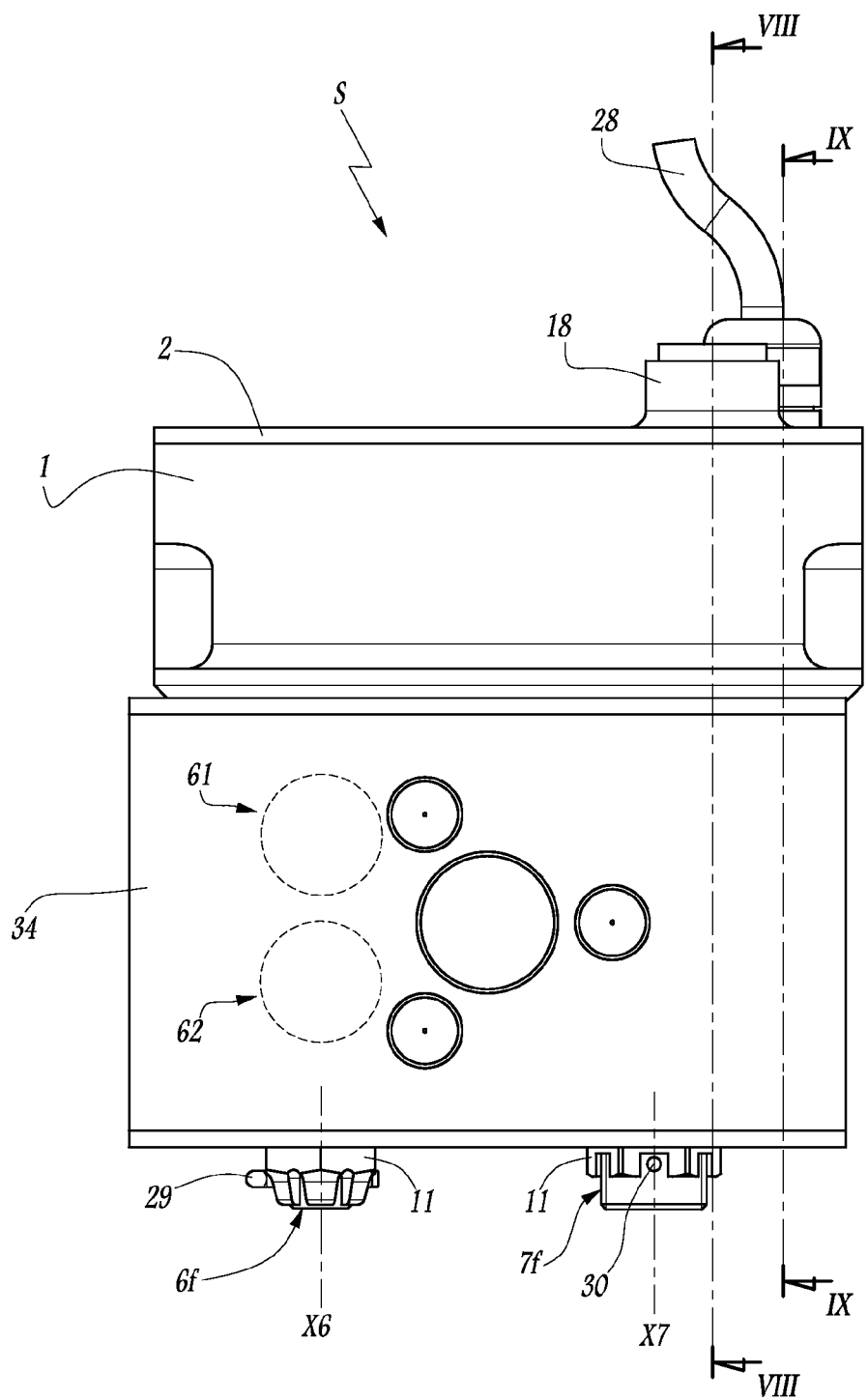

An indicating plate 27 is placed on the external surface of the cover 2, as may be seen in FIG. 1. Information and writing may appear on the plate 27, for example to identify the manufacturer and the product. Alternatively, the plate 27 may take the form of a screen capable of displaying messages, especially information sent to it by the electronic card 3. Moreover, it is conceivable to juxtapose an identification plate with a display plate.

A knob 18 is provided on the cover 2, enabling a switch 23 provided in the casing 1 to be actuated via a torsion spring 21 and an actuator 22, the latter cooperating with the switch 23, as may be seen in FIGS. 8 and 9. Upon installing the system S, so as to check that it is operating, an operator can test it using the knob 18. For this purpose, the operator rotates the knob 18 with a spanner, until it comes up against a stop. In the event of failure of the system S, a notification may for example be displayed on the indicating plate 27. As soon as the operator removes the spanner, the knob 18 returns to the initial position by virtue of the torsion spring 21. The stiffness of the spring 21 is designed so as not to impede the manual action by the operator. A seal 19 is placed in the body of the knob 18.

Figure 11:
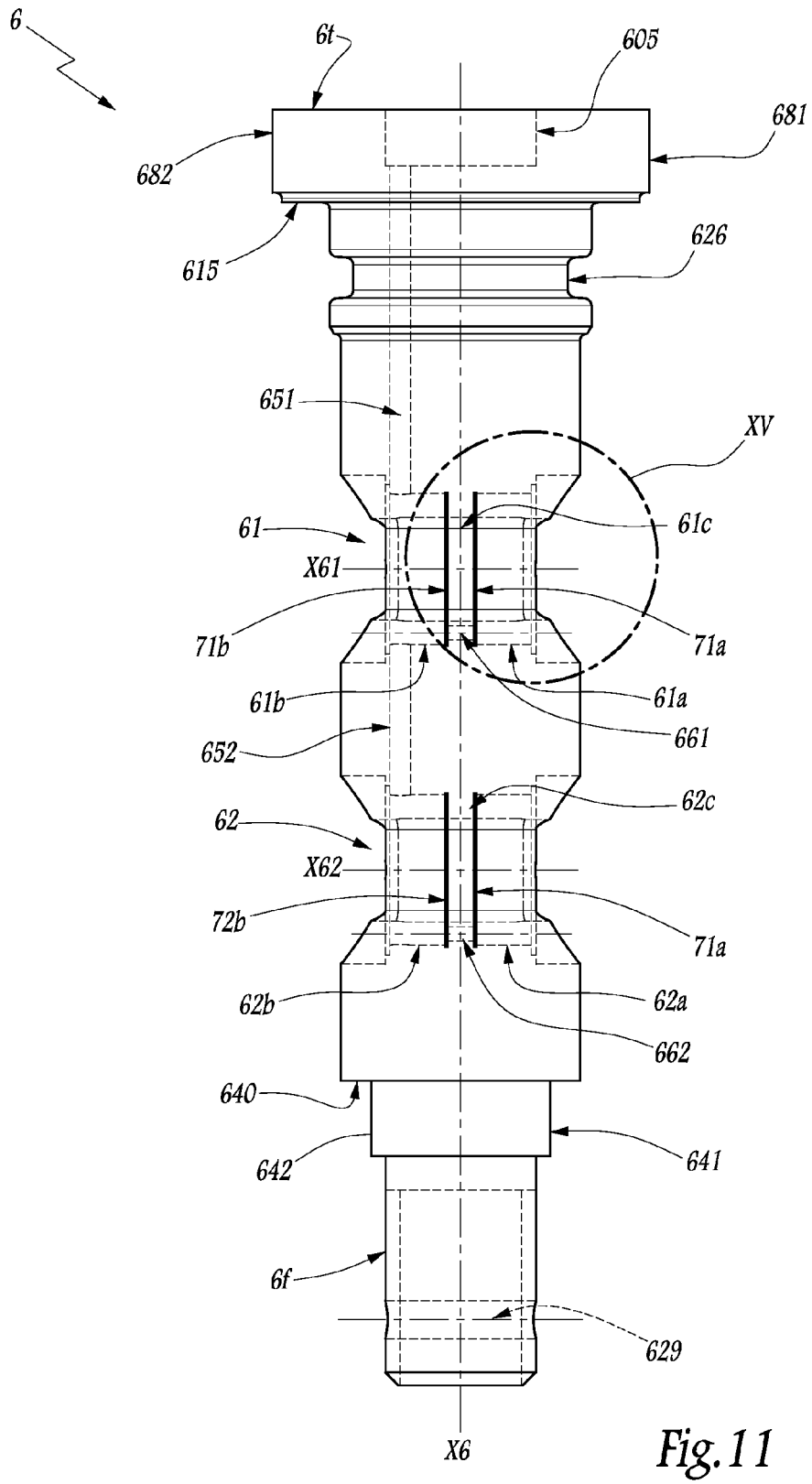
FIG. 11 is an elevation view of the instrumented bolt along the arrow XI in FIG. 10.
Figure 13:
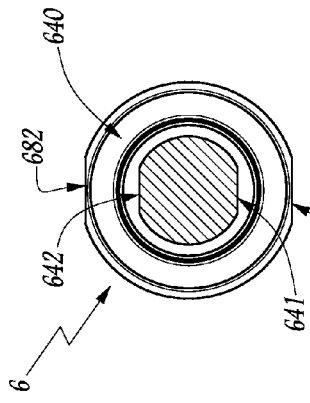
FIG. 13 is a cross section along the line XIII-XIII of FIG. 10.
Figure 15:
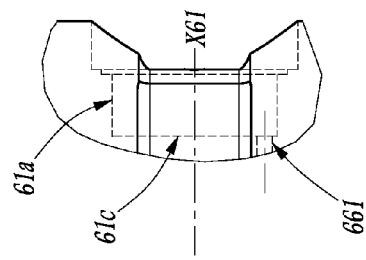
FIG. 15 is a view on a larger scale of the detail XV of FIG. 11.
Figure 12:
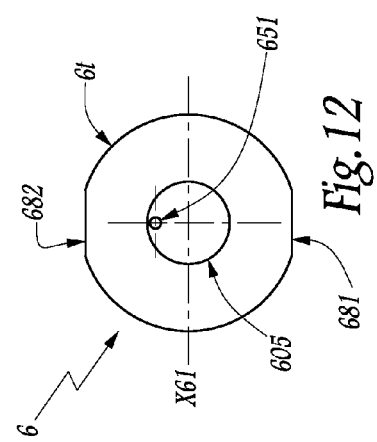
FIG. 12 is an elevation view, on a smaller scale, along the arrow XII in FIG. 10.
Figure 14:
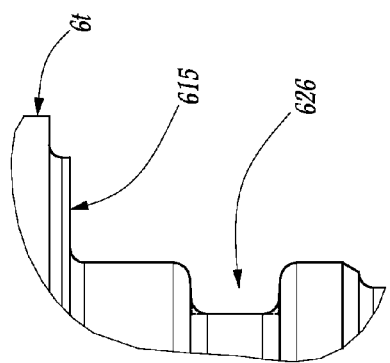
FIG. 14 is a view on a larger scale of the detail XIV of FIG. 10.

The system S also comprises two bolts 6 and 7 which are designed to work in shear and the heads 6t and 7t of which are placed in the casing 1. Most of the bolt 6 extends outside the casing 1 along an axis X6 as far as a threaded end 6f capable of receiving a washer 12 and a nut 11. Most of the bolt 7 extends outside the casing 1 along an axis X7, as far as a threaded end 7f capable of receiving a washer 9 and a nut 10. More precisely, the instrumented bolt 6 bears strain gauges 71a, 71b, 72a, 72b, as shown in FIG. 11, whereas the bolt 7 is a standard, non-instrumented bolt. The standard bolt 7 is preferably made of a steel alloy, for example, a grade 4340 steel.

The system S also includes a fastening plate 4 intended for mounting the bolts 6 and 7. The plate 4 is positioned on that end of the bolts 6 and 7 on the opposite side from the casing 1, i.e. on the side of the threaded ends 6f and 7f, and extending perpendicularly to the axes X6 and X7. In particular, as may be seen in FIGS. 1 and 7, the plate 4 comprises a part 4a corresponding to the bolt 6, a part 4c corresponding to the bolt 7 and an intermediate part 4b extending between the parts 4a and 4c. The part 4a of the plate 4 has an orifice 460 through which the bolt 6 passes, and the part 4c has an orifice through which the bolt 7 passes.

As may be seen in FIGS. 1 to 11 and in FIG. 16, the instrumented bolt 6 comprises two separate measurement areas 61 and 62 that are arranged along the axis X6. The measurement area 61 comprises a cavity 61a and a cavity 61b that are separated by a thinned wall 61c, each being intended to house the gauge 71a or the gauge 71b respectively, these being placed in the bottom against the thinned wall 61c. The cavities 61a and 61b are of cylindrical shape, open to the outside of bolt 6 and centred on an axis X61. Likewise, the measurement area 62 comprises a cavity 62a and a cavity 62b that are separated by a thinned wall 62c, each being intended to house the gauge 72a or the gauge 72b respectively, these being placed in the bottom against the thinned wall 62c. The cavities 62a and 62b are of cylindrical shape, open to the outside of the bolt 6 and centred on the axis X62. The thinned walls 61c and 62c are oriented parallel to the axis X6 of the bolt 6 and oriented perpendicularly to the axes X61 and X62 respectively.

In practice, as may be seen in FIGS. 3 and 11, the strain gauges 71a, 71b, 72a and 72b are positioned by being adhesively bonded to the respective surfaces of the thinned walls 61c and 62c, which therefore requires them to have a very good surface finish. Each gauge 71a, 71b, 72a, 72b is protected from water and dust by a welded metal cover (not shown), the welding preferably being carried out by laser welding between the cover and the corresponding cavity 61a, 61b, 62a or 62b.

Thus, each gauge 71a, 71b, 72a and 72b is capable of measuring a strain applied on the bolt 6, in particular a shear strain applied on the bolt 6 in a direction transverse to the axis X6. For this purpose, the gauges 71a, 71b, 72a and 72b may in particular detect a deformation of the thinned walls 61c and 62c.

Such a configuration offers high measurement precision and reliability, and also good repeatability. The gauges 71a, 71b, 72a and 72b are also protected in the cavities 61a, 61b, 62a and 62b, something which would not be the case if they were to be placed directly on the surface of the instrumented bolt 6.

Furthermore, each measurement area 61 or 62 is instrumented by a half Wheatstone bridge. Thus, the junction between the gauges 71a and 71b of the area 61 and the gauges 72a and 72b of the area 62 constitute a complete Wheatstone bridge. Preferably, the detection threshold of each gauge 71a, 71b, 72a and 72b is equal to ±1000 N. For the purpose of achieving optimum detection, the detection range chosen for each gauge 71a, 71b, 72a and 72b is equal to ±4000 N.

In addition, each gauge 71a, 71b, 72a and 72b is provided with electrical wires (not shown) via which the measurement signals pass. The wires are brought up through the orifices 651, 652, 661 and 662 that are housed in the body of the bolt 6, as shown in particular by the dotted lines in FIGS. 10 and 11. In other words, the orifices 651, 652, 661 and 662 enable the strain gauges 71a, 71b, 72a and 72b to be connected to the electronic card 3 located in the casing 1. The transverse orifice 661 connects the cavities 61a and 61b and the gauges 71a and 71b of the measurement area 61, whereas the transverse orifice 662 connects the cavities 62a and 62b and the gauges 72a and 72b of the measurement area 62. The longitudinal orifice 652 connects the transverse orifices 661 and 662, whereas the longitudinal orifice 651 connects the orifice 661 to the bolt head 6t, more precisely the orifice 651 opens into a cavity 605 located in the head 6t.

Moreover, as may be seen in FIGS. 10 to 15, the bolt 6 is designed so as to make it easy to fit it into the system S. Thus, the bolt head 6t is provided with a shoulder 615, below which there is an annular groove 626 intended to accommodate a seal 14 and two anti-rotation flats 681 and 682 in order to position it in the casing 1. On its threaded end side, the instrumented bolt 6 comprises a transverse borehole 629 intended to accommodate a pin 29, and a shoulder 640 and two anti-rotation flats 641 and 642 in order to position it relative to the part 4a of the fastening plate 4.

In practice, the instrumented bolt 6 makes it possible to measure the shear strains that are applied to it when it is installed on the secondary load path SLP, as explained in detail below.

The secondary load path SLP comprises, as may be seen in FIGS. 4 to 9, a U-shaped yoke 36, the two arms 36a and 36b of which are placed on either side of a bracket arm 34 belonging to the carrier structure of the aircraft. In particular, the yoke 36 is made of steel, whereas the bracket 34 is made of aluminium. The three arms 34, 36a and 36b are substantially parallelepidedal, interleaved with their plane faces opposite one another, but without being in contact. Two through-orifices are drilled so as to be perpendicular to the three arms, intended to accommodate the instrumented bolt 6 and the standard bolt 7. In fact, six boreholes constitute the two orifices for accommodating the bolts 6 and 7.

More precisely, as may clearly be seen in FIG. 7, the orifice for accommodating the instrumented bolt 6 houses: a tubular bush 32, which is placed in the corresponding borehole of the arm 36a; a tubular bush 33, which is provided with a shoulder and placed in the corresponding borehole of the bracket 34;

and a tubular bush 35, which is provided with a shoulder and placed in the corresponding borehole of the arm 36b. Likewise, the orifice for accommodating the standard bolt 7 houses: a tubular bush 32', which is placed in the corresponding borehole of the arm 36a; a tubular bush 33', which is provided with a shoulder and placed in the corresponding borehole of the bracket 34; and a tubular bush 35', which is provided with a shoulder and placed in the corresponding borehole of the arm 36b. The various bushes 32, 33, 35, 32', 33' and 35' belong to the fastener of the secondary path SLP and not directly to the system S and to the kit LSK.

In practice, the instrumented bolt 6 is housed in the corresponding accommodating orifice, inside the space bounded by the bushes 32, 33 and 35. Likewise, the standard bolt 7 is housed in the corresponding accommodating orifice, inside the space bounded by the bushes 32', 33' and 35'. However, the bolt 6 and the bolt 7 are interchangeable, without this impeding the operation of the system S. Thus, the risk of an error for the operator is reduced.

The bolt heads 6t and 7t are placed in the casing 1, which bears against the bushes 32 and 32'. On the other side, the fastening plate 4 is placed at the threaded ends 6f and 7f of the bolts 6 and 7. The plate 4 bears against the arm 36b of the yoke 36 level with the substantially plane faces of the parts 4a and 4c. The nuts 10 and 11 are then put into place and tightened, as will be explained in detail later. In particular, the part 4a of the plate 4 bears against the shoulder 640 of the bolt 6. Likewise, the presence of the spring washer 12 between the nut 11 and the plate 4 prevents a gap appearing between the plate 4 and the arm 36b.

More precisely, as may be seen in FIG. 7, the elements bearing on the instrumented bolt 6 side are the following: head 6t; spring washer 15; casing 1; bush 32; shoulder of the bush 33; bracket 34; shoulder of the bush 35; arm 36b of the yoke 36 and shoulder 640; fastening plate 4; washer 12; and nut 11. The rigid bearing elements are similar on the standard bolt 7 side, apart from the shoulder 640.

During production of the system S, before delivery of the LSK ready for use, the two bolts 6 and 7 are integrated in the casing 1. Prepositioning means make it easy to fit the bolts 6 and 7, thereby enabling the system S to be mounted more rapidly. Inside the casing 1, the bolt heads 6t and 7t are covered by the locking plate 5, which is fastened by bolts 16. The plate 5 makes it possible to ensure that the screws 6 and 7 are kept in place, especially so that they cannot damage the electronic card 3 in the event of the system S being dropped or suffering a shock during mounting. The plate 5 is open for the passage of the electrical wires coming from the instrumented bolt 6, these being connected to the electronic card 3.

Moreover, the casing 1 also participates in holding the bolt head 6t or 7t in place; thus it is not necessary for the operator himself to hold them in place when tightening the nuts 10 and 11, thereby saving time. In particular, the flats 681 and 682 of the bolt head 6t provide an anti-rotation function by being positioned in a complementary orifice of the casing 1, with a slight rotational slack before coming into abutment. In addition, the relative arrangement of the flats 681 and 682 and of the casing 1 makes it possible to ensure that the instrumented bolt 6, in particular the measurement area 61 and 62 and therefore the gauges 71a, 71b, 72a and 72b, are in the correct angular orientation essential for its operation.

Furthermore, as may be seen in FIG. 7, an oblong orifice 24 is provided in the casing 1 for passage of the bolt 7. Consequently, the inter-axis distance between the bolts 6 and 7 may have a certain mounting tolerance, thereby making it easier to position them in the yoke 36 and the bracket 34. The head 7t of the bolt 7 rests on a washer 8.

Thus, the casing 1 withstands the stresses due to vibrations, to the axial preload and to the operation of rotationally locking the bolts 6 and 7. As regards the standard bolt 7, the vibrations are limited because of the sufficient tightening torque applied to the nut 10. The axial preload and the rotational locking of the bolt 7 result directly from this tightening torque.

As regards the instrumented bolt 6, the vibrations, especially due to part of the mass of the casing 1, the electronic card 3, the cover 2 and the knob 18, are limited because of the presence of the spring washer 15 positioned under the bolt head 6t. The axial preload of the bolt 6 also results from the presence of this spring washer 15, and not from tightening the nut 10. In addition, the relative arrangement between the flats 641 and 642 and the orifice 460 of the plate 4 ensures that the instrumented bolt 6 is rigidly locked, preventing it from rotating, and it is also unnecessary for the bolt head 6t to be rigidly locked, so as to prevent it from rotating in the casing 1, at the flats 681 and 682, hence the slack.

Since the stresses exerted on the casing 1 remain relatively low, it is possible to make the casing 1 from an aluminium alloy, especially a 2024 aluminium alloy grade. The presence of the seals 14, 25 and 26 prevents oil or water from penetrating into the casing 1, thus sealing the casing 1 and protecting the electronic card 3.

Furthermore, the spring washer 15 enables the elements to be held in position relative to one another without deforming, and reduces the vibrations in the casing 1. The washer 15 is also intended to maintain contact between the casing 1 and the bush 32, for example when the aircraft is accelerating, and thus to reduce shocks and contact wear. Moreover, a localized hardness treatment may be carried out on the casing 1 in the area of contact with the bush 32.

In operation, the system S is more particularly held in position, on the one hand, by the nut 10 of the bolt 7 and, on the other hand, by the spring washer 15 of the bolt 6.

Thus, when the system S is installed, and especially when the bolts 6 and 7 are in place, the yoke 36 is rigidly connected to the bracket 34 and the secondary load path SLP is connected to the structure of the aircraft. In this way, the secondary path of the attachment of the THSA is engaged.

In practice, during operation of the aircraft, the bracket 34 and the yoke 36 are subjected to loads that cause them to move relative to one another. In this case, shear stresses are transmitted to the bolts 6 and 7 via the bushes 32, 33, 35, 32', 33' and 35' at the substantially plane interfaces between the yoke 36 and the bracket 34 that then constitute shear sections.

In other words, as may be seen in FIG. 7, the first plane interface corresponds to the measurement area 61 of the instrumented bolt 6: this interface lies at the space between the arm 36a and the bracket 34, between the bush 32 and the bush 33, substantially in a shear plane PC1 perpendicular to the axis X6. As regards the second plane interface, this corresponds to the measurement area 62 of the instrumented bolt 6: it is located in the space between the bracket 34 and the arm 36b, between the bush 33 and the bush 35, substantially in the plane PC2 perpendicular to the axis X6. Thus, two gauges, 71a and 71b, or 72a and 72b respectively, correspond to each shear plane PC1 or PC2. The thinned walls 61c and 62c are oriented so as to be perpendicular to the shear planes PC1 and PC2, which are themselves located at two plane interfaces between the aircraft carrier structure 34 and the load path 36.

Preferably, the instrumented bolt 6 is manufactured from stainless steel having a high yield strength. The bolt 6 has high mechanical strength properties for the purpose of withstanding shear stresses ranging up to 20 000 N without undergoing permanent deformation. Such a deformation may be seen in FIG. 16: when the arms 34, 36a and 36b suffer a relative displacement, they exert opposed forces on the bolt 6, represented by the arrows F34, F36a and F36b respectively in FIG. 16. Consequently, when the admissible level of stress exerted on the bolt 6 is exceeded, the latter is liable to deform, damaging the gauges 71a, 71b, 72a and 72b, in the shear planes PC1 and PC2.

Advantageously, the system S may be installed on a new aeroplane or as a replacement of an existing system. During such an operation, it is simpler and quicker to change only the two secondary path attachment bolts than the other mechanical elements. In this case, the system S may be installed on the secondary path without it being necessary to modify the attachment of the flight control actuator. The bolts already in place, corresponding to the bolts 6 and 7, are withdrawn and the system S is then positioned and tested so as to ensure that it is operating correctly. The adjustments between the guiding bushes 32, 33 and 35 and the instrumented bolt 6 are unchanged in comparison with the original adjustments between the bushes 32, 33 and 35 and a pre-existing non-instrumented bolt.

The installation or maintenance procedure for the system S is explained in detail below.

In practice, the operator follows a pre-established installation or maintenance procedure. Firstly, the two pre-existing bolts are removed. Next, with the LSK at his disposal, the operator installs the system S on the attachment of the secondary path SLP of the THSA. The operator firstly positions the assembly comprising the casing 1 and the bolts 6 and 7, paying very particular attention to the insertion of the bolts 6 and 7 in the boreholes of the bushes 32, 33, 35, 32', 33' and 35'. The operator then positions the fastening plate 4 on the end of the bolts 6 and 7, against the arm 36a of the yoke 36, paying very particular attention to the relative positioning of the flats 641 and 642 of the instrumented bolt 6 cooperating with the complementary orifice 460 of the plate 4. Preferably, a single relative position is permitted, thereby making the operator's work easier. Finally, the operator positions the washers 9 and 12, tightens the nuts 10 and 11 and positions the security pins 29 and 30.

Upon tightening the nuts 10 and 11 against the plate 4, forces are transmitted to the bolts 6 and 7 from their threaded parts 6f and 7f. As a result, it is necessary to ensure that these forces do not disturb the positions of and the measurements by the gauges 71a, 71b, 72a and 72b placed in the instrumented bolt. More particularly, the gauges 71a, 71b, 72a and 72b must not be disturbed by tensile or torsional stresses generated by tightening the nut 11, before they are put into operation on the secondary path SLP.

However, it is necessary to tighten the nut 11 on the threaded end 6f of the instrumented bolt 6, in particular so as to limit the risk of vibration, but without exerting excessive stress on the bolt 6. In practice, when tightening the nut 11, the part 4a of the plate 4 buts against the shoulder 640 of the bolt 6, thereby enabling the tensile stresses in the bolt 6 to be localized between the shoulder 640 and the nut 11, away from the measurement area. The presence of the washer 12 prevents the appearance of slack between the part 4a of the plate 4 and the arm 36a. Moreover, the anti-rotation flats 641 and 642 located on the bolt 6 enable the torsional stresses to be limited in the close vicinity thereof, always between the shoulder 640 and the nut 11, away from the measurement area. Moreover, the flats 641 and 642 communicate the clamping forces to the plate 4, which communicates these forces to the standard bolt 7, which therefore accommodates essentially all the tightening forces.

Because of the presence of the fastening plate 4, the system S is held in place without it being necessary for lengthy and fastidious calibration or adjustment with a more complex electronic system. This device, including the plate 4, makes it possible to obviate the mounting stresses due to the nuts 10 and 11 being tightened.

Advantageously, the nuts 10 and 11 are different: the threaded end 7f and the nut 11 of the standard bolt 7 are threaded on the basis of the imperial (inch-based) system, whereas the threaded end 6f and the nut 10 of the instrumented bolt 6 are threaded on the basis of the metric system (thus, the thread pitches are different, but the clamping torques are the same). In this case, two spanner end-fittings are necessary, but they remain standard spanners. This also helps the operator to not confuse the two bolts.

However, to avoid errors during installation, it is preferable for the instrumented bolt 6 and the standard bolt 7 to be tightened to the same clamping torque. As an indication, the clamping torque may for example be between 1.95 and 2.2 daN.m.

FIGS. 17 and 18 show a flight control device for the THSA comprising a primary load path PLP capable of accommodating the load exerted in normal operation on the attachment of the THSA and a secondary load path SLP capable of accommodating said load in the event of the primary path PLP failing. These figures again show the yoke 36 provided with the two arms 36a and 36b in which the bolts 6 and 7 are placed. The yoke 36 is accommodated in a cylindrical component 46 of the secondary load path SLP. A ball joint is provided inside the components 36 and 46 for fastening the device and in particular for transferring load in the THSA. The bracket 34 is not shown in these figures.

As an alternative (not shown), the bolt 6 may have only one measurement area 61 or 62. However, in this case, the configuration of the Wheatstone bridge must be adapted accordingly.

According to another alternative (not shown), each measurement area 61 or 62 may have only one strain gauge 71a, 71b, 72a or 72b. In this case too, the Wheatstone bridge configuration must be adapted accordingly.

According to another alternative (not shown), each measurement area 61 or 62 may have a different arrangement, in particular the cavities 61a, 61b, 62a, 62b and the thin walls 61c, 62c may be of different forms or differently positioned. In particular, the cavities 62a and 62b need not be open to the outside of the bolt 6 but lie within the body of the bolt 6, produced for example using an axial drilling operation.

According to another alternative (not shown), the instrumented bolt 6 has only one flat 641 or 642, and the orifice 460 of the plate 4 is configured accordingly.

According to another alternative (not shown), the two bolts 6 and 7 are not instrumented.

The invention claimed is:

1. A flight unit control system, comprising at least one instrumented fastening bolt connecting an aircraft carrier structure and a load path, the at least one instrumented bolt having at least one measurement area for detecting that the load path is under load, the system comprising fastening means for locking the at least one instrumented bolt in position relative to the aircraft carrier structure and to the load path without stressing the at least one instrumented bolt in the at least one measurement area, neither in tension nor in torsion, wherein the at least one measurement area of the at least one instrumented bolt includes:

two cavities which are opposite each other in relation to an axis and separated from each other along a transverse axis by a thin wall that is deformed under a shear stress applied to the at least one instrumented bolt, and at least one strain gauge which is placed in a bottom of one of the cavities against the thin wall, the at least one strain gauge detecting a deformation of the thin wall, and in that the fastening means includes:

a fastening plate which is positioned at a threaded end of the at least one instrumented bolt, bearing against one of the aircraft carrier structure and the load path, and which extends perpendicularly to the axis of the at least one instrumented bolt, and a nut which is placed on the threaded end of the at least one instrumented bolt and immobilizes the at least one instrumented bolt relative to the one of the aircraft carrier structure and the load path against which the fastening plate bears.

2. The flight unit control system according to claim 1, wherein the at least one measurement area includes two strain gauges each placed on one side of the thin wall that forms a plane orthogonal to a shear plane for the at least one instrumented bolt.

3. The flight unit control system according to claim 1, including two measurement areas located in shear planes for the at least one instrumented bolt, which areas follow one after the other along the at least one instrumented bolt and are located at two plane interfaces respectively between the aircraft carrier structure and the load path.

4. The flight unit control system according to claim 1, wherein the at least one instrumented bolt has at least one flat which is placed between the threaded end and the at least one measurement area close to the threaded end, the portion of the bolt having the at least one flat being housed in a complementary orifice of the fastening plate so that the instrumented bolt is locked and unable to rotate relative to the fastening means, and wherein tensile forces exerted on the at least one instrumented bolt by tightening the nut are localized substantially between a shoulder of the at least one instrumented bolt and the nut, away from the at least one measurement area.

5. The flight unit control system according to claim 1, wherein the at least one instrumented bolt has a transverse shoulder which is placed between the threaded end and the at least one measurement area closest to the threaded end, the shoulder bearing against the fastening plate so that the at least one instrumented bolt is locked, preventing it from moving translationally with respect to the fastening means, and in that tensile stresses on the at least one instrumented bolt generated by tightening the nut are localized substantially between the shoulder and the nut, away from the at least one measurement area.

6. The flight unit control system according to claim 1, including a second instrumented bolt that extends along an axis parallel to the axis of a first instrumented bolt and connects the aircraft carrier structure and the load path.

7. The flight unit control system according to claim 1, including:

a non-instrumented bolt that extends along an axis parallel to the axis of the at least one instrumented bolt and connects the aircraft carrier structure and the load path ; and a nut which is placed at a threaded end of the non-instrumented bolt for clamping the fastening plate against the aircraft carrier structure or the load path against which the fastening plate bears and which withstands essentially all of clamping stresses of the plate.

8. The flight unit control system according to claim 7, wherein the nut of the at least one instrumented bolt and the nut of the non-instrumented bolt have different screw pitches, but are locked under the action of a substantially identical tightening torque.

9. The flight unit control system according to claim 1, including a casing in which an electronic card is placed in a substantially sealed manner, the card being connected to the at least one strain gauge, and away from which most of the at least one instrumented bolt extends.

10. The flight unit control system according to claim 9, wherein an interior of the at least one instrumented bolt includes a plurality of through-orifices in which connection wires are placed that connect the at least one strain gauge and the electronic card located in the casing, with:

a longitudinal orifice that extends parallel to the first axis, where appropriate connecting a plurality of measurement areas together; and in each of the plurality of measurement areas, a through-orifice connects a plurality of strain gauges located in corresponding cavities at the longitudinal orifice.

11. The flight unit control system according to claim 9, wherein the casing has a projecting rotary knob, the knob being manipulated by an operator so as to test an operation of the system.

12. The flight unit control system according to claim 11, wherein the casing has display means including an indicating plate, for displaying results of the test carried out by operation of the knob.

13. The flight unit control system according to claim 9, including a spring washer which is positioned in the casing, between the head of the at least one instrumented bolt and the casing, and which damps vibrations in the casing and keeps the at least one instrumented bolt axially in place.

14. Use of a flight unit control system according to claim 13 for replacing a pre-existing system which equips a secondary load path based on an attachment of a flight control actuator, to replace a pre-existing fastening bolt connecting an aircraft carrier structure and the secondary load path with the at least one instrumented fastening bolt, without modifying an attachment of the flight control actuator.

15. The flight control device, for an actuator of the THSA type, comprising:

a primary load path capable of accommodating a load exerted in normal operation on an attachment of a flight control actuator; and a secondary load path capable of accommodating the load in the event of a primary path failing, and wherein the secondary load path includes a flight unit control system according to claim 1.

16. Use of a flight unit control system according to claim 1 for replacing a pre-existing system which equips a secondary load path based on an attachment of a flight control actuator, to replace a pre-existing fastening bolt connecting an aircraft carrier structure and the secondary load path with the at least one instrumented fastening bolt, without modifying an attachment of the flight control actuator.

* * * * *